United States Patent [19]

Cummings

[11] Patent Number: 5,471,872
[45] Date of Patent: Dec. 5, 1995

[54] ACOUSTIC LIQUID LEVEL MEASURING APPARATUS

[75] Inventor: Charles A. Cummings, Kalispell, Mont.

[73] Assignee: Semitool, Inc., Kalispell, Mont.

[21] Appl. No.: 178,580

[22] Filed: Jan. 7, 1994

[51] Int. Cl.[6] .................................................. G01F 23/296
[52] U.S. Cl. .................................................. 73/290 V
[58] Field of Search .......................... 73/290 V; 181/124; 367/908

[56] References Cited

U.S. PATENT DOCUMENTS

| | | | |
|---|---|---|---|
| 3,693,445 | 9/1972 | Johnson | 73/290 V |
| 3,910,116 | 10/1975 | Smith | 73/290 V |
| 4,090,407 | 5/1978 | Shuler et al. | 73/290 V |
| 4,130,018 | 12/1978 | Adams et al. | 73/290 V |
| 4,210,969 | 7/1980 | Massa | 367/108 |
| 4,318,298 | 3/1982 | Godbey et al. | 73/155 |
| 4,448,207 | 5/1984 | Parrish | 128/771 |
| 4,909,080 | 3/1990 | Kikuta et al. | 73/290 V |
| 4,955,004 | 9/1990 | Viscovich | 367/137 |
| 5,038,611 | 8/1991 | Weldon et al. | 73/290 V |
| 5,078,004 | 1/1992 | Nyseth | 73/861.55 |
| 5,085,077 | 2/1992 | Stapleton et al. | 73/290 V |

FOREIGN PATENT DOCUMENTS

| | | | |
|---|---|---|---|
| 55-76918 | 6/1908 | Japan | 73/290 V |
| 58-90129 | 5/1983 | Japan | 73/290 V |
| 5001936 | 1/1993 | Japan | 73/290 V |
| 257058 | 10/1970 | U.S.S.R. | 73/290 V |
| 430-286 | 11/1974 | U.S.S.R. | 73/290 V |
| 1721444 | 3/1992 | U.S.S.R. | 73/290 V |
| 1123939 | 8/1968 | United Kingdom | 73/290 V |

Primary Examiner—William A. Cuchlinski, Jr.
Assistant Examiner—Willie Morris Worth
Attorney, Agent, or Firm—Wells, St. John, Roberts, Gregory & Matkin

[57] ABSTRACT

An acoustic liquid level detector system includes, a) a first acoustic wave guide; b) an acoustic wave transmitter and an acoustic wave receiver operably associated with the first acoustic wave guide to transfer acoustic waves between, i) the acoustic transmitter and receiver; and ii) the first acoustic wave guide; c) a second acoustic wave guide; d) an angled juncture interconnecting the first acoustic wave guide to the second acoustic wave guide; e) a primary acoustic reflector provided in the angled juncture to angularly reflect acoustic waves between the first and second acoustic wave guides; and f) a secondary acoustic reflector positioned to directly reflect an acoustic wave emanating from the acoustic wave transmitter to the acoustic wave receiver. The second acoustic wave guide is provided with a plurality of longitudinally spaced orifices to facilitate ingress of liquid and flow of a cleaning purge gas outwardly of the second acoustic wave guide. A purge gas port is provided in the first acoustic wave guide for injecting purge gas into the system.

25 Claims, 2 Drawing Sheets

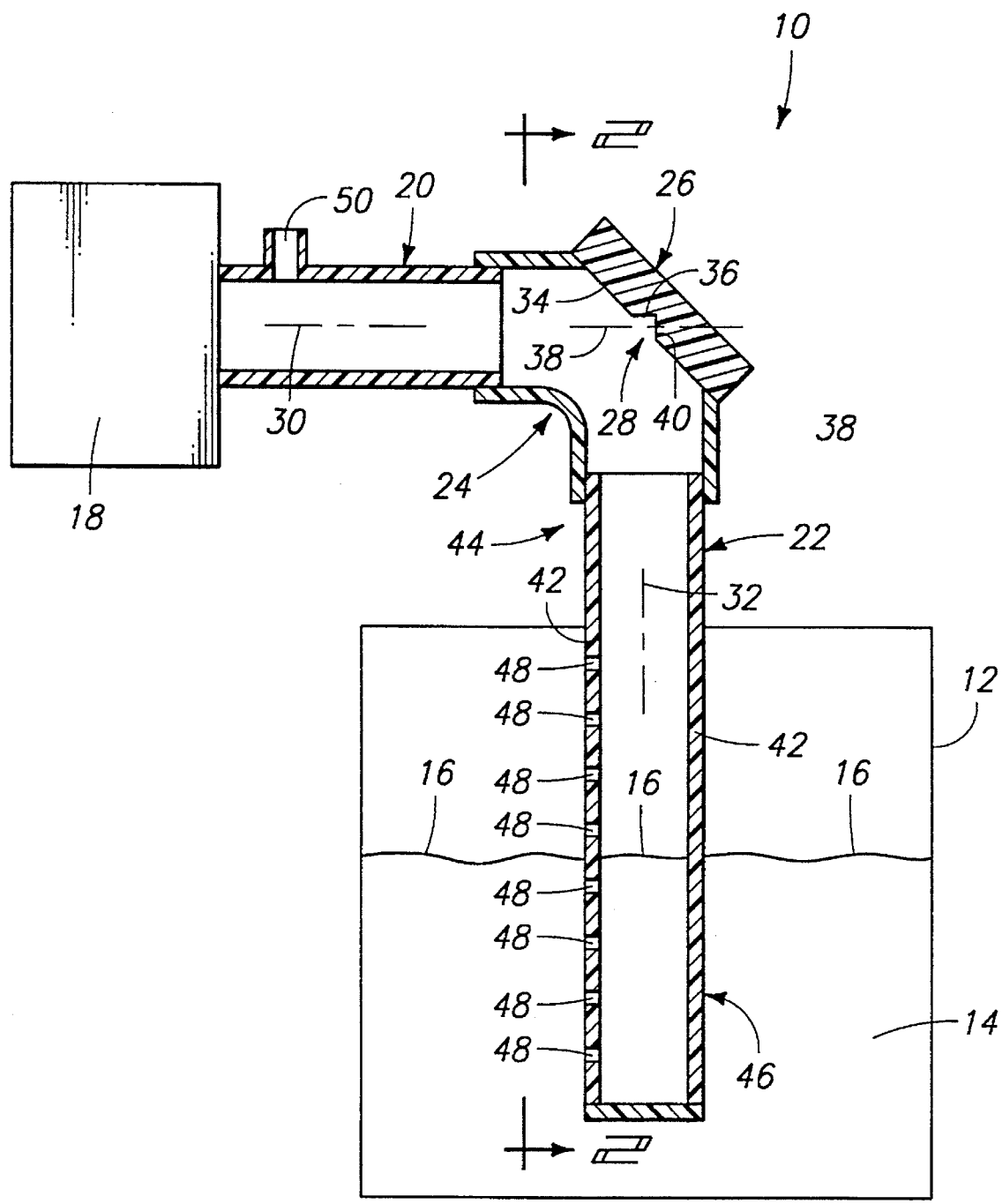

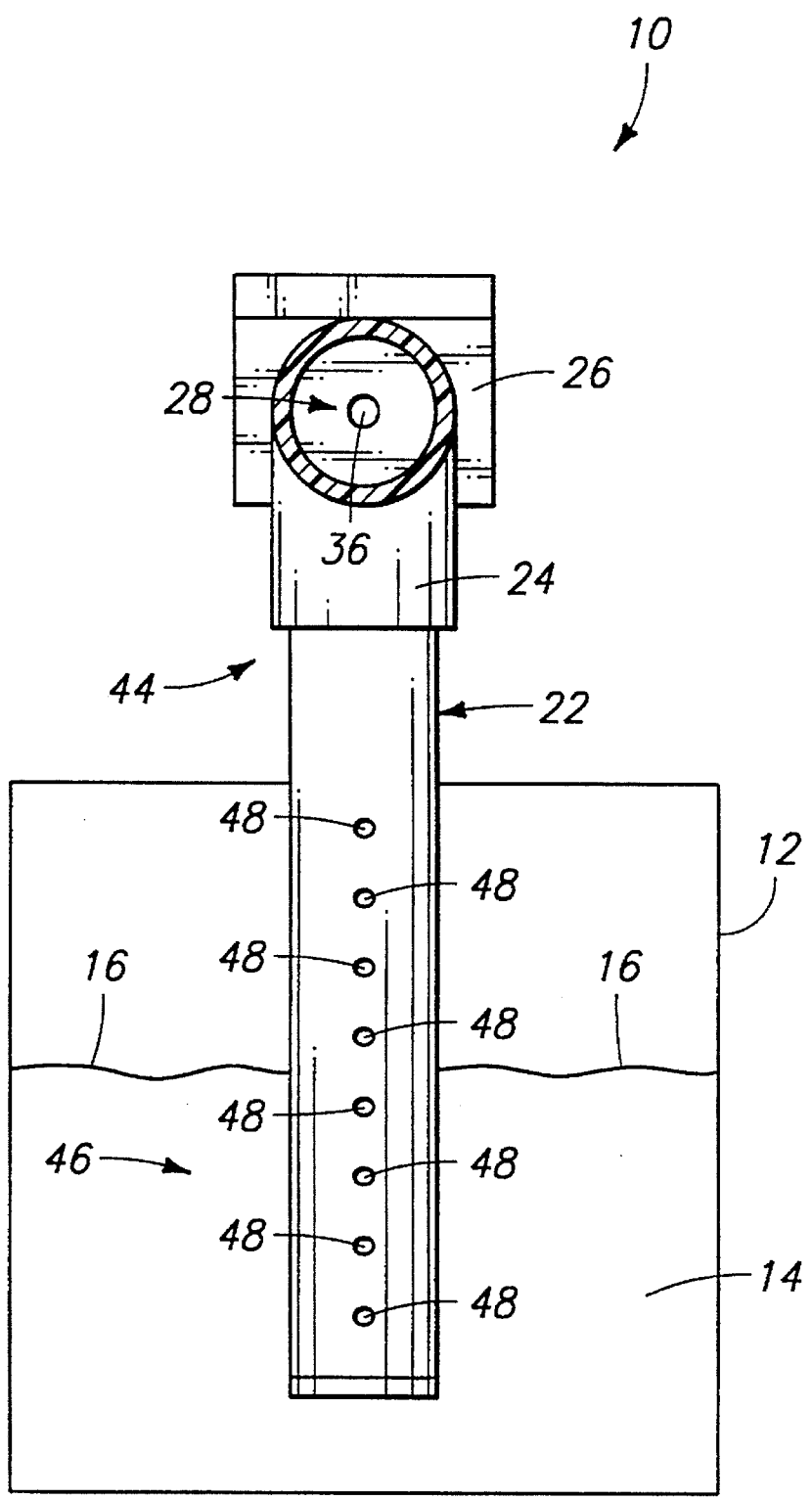

5,471,872

ACOUSTIC LIQUID LEVEL MEASURING APPARATUS

TECHNICAL FIELD

This invention relates to acoustic liquid level detector systems.

BACKGROUND OF THE INVENTION

This invention arose out of needs and concerns in the semiconductor processing industry regarding accurate determination of liquid volume in semiconductor processing fluid containers. The invention will, however, have other applications and is limited only by the accompanying claims.

The production of integrated circuitry in semiconductor wafers typically utilizes processing equipment in which various types of processing liquids are used to treat wafers and other substrates. The liquid utilized in such equipment is typically pumped from bottles or other containers into a processing area of the equipment where one or more substrates are received. Such liquids are typically provided to the processing area in precise volumes. One way of determining the volume of liquid supplied to a processor would be to precisely measure the deceasing volume of fluid within the respective containers resulting from operation of fluid delivery pumps. It further is desirable to monitor the volume of liquid within the various liquid containers to determine when such containers need to be refilled with more processing liquid.

In accordance with aspects of this invention, liquid level and change of liquid level within such containers is monitored or determined by acoustic reflection off the liquid level surface in the containers.

BRIEF DESCRIPTION OF THE DRAWINGS

Preferred embodiments of the invention are described below with reference to the following accompanying drawings.

FIG. 1 is a side diagrammatic representation of an acoustic liquid level detector system in accordance with the invention.

FIG. 2 is a sectional view of FIG. 1 taken along line 2—2.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with one aspect of the invention, an acoustic liquid level detector system comprises:

a first acoustic wave guide;

an acoustic wave transmitter and an acoustic wave receiver operably associated with the first acoustic wave guide to transfer acoustic waves between, a) the acoustic transmitter and receiver; and b) the first acoustic wave guide;

a second acoustic wave guide;

an angled juncture interconnecting the first acoustic wave guide to the second acoustic wave guide;

a primary acoustic reflector provided in the angled juncture to angularly reflect acoustic waves between the first and second acoustic wave guides; and a secondary acoustic reflector positioned to directly reflect an acoustic wave emanating from the acoustic wave transmitter to the acoustic wave receiver.

In accordance with another aspect of the invention, an acoustic liquid level detector system comprises:

an acoustic wave transmitter;

at least one longitudinally elongated acoustic wave guide operably associated with the transmitter to receive acoustic waves transmitted therefrom, the acoustic wave guide having sidewalls including a first longitudinal end portion and a second longitudinal end portion, the first end portion being configured to receive acoustic waves from the transmitter and transfer such waves to the second end portion, the second end portion being configured to be placed through an upper level of liquid and including a plurality of longitudinally spaced orifices extending through the sidewalls; and means for injecting a purge gas into the acoustic wave guide for cleaning flow outwardly of the orifices positioned adjacently above the liquid level when the second end portion is received in liquid.

Other aspects of the invention will be appreciated from the following description of a preferred embodiment. Referring to the FIGS. 1 and 2, an acoustic liquid level detector system is indicated generally by reference numeral 10. Such is positioned relative to a container 12 within which resides a volume of liquid 14. For purposes of the continuing discussion, liquid volume 14 has an upper liquid level 16 which moves downwardly as liquid would be withdrawn from container 12. Means for adding or withdrawing liquid from container 12 are not shown since various conventional systems can be used. System 10 extends into container 12 to monitor the elevational position of liquid level 16.

Liquid level detector system 10 comprises an integrated acoustic wave transceiver 18, first and second acoustic wave guides 20 and 22, respectively, and an angled juncture 24 which interconnects the first and second acoustic wave guides. Transceiver 18 is preferably in the form of an ultrasonic wave transceiver which both transmits and receives acoustic waves within the ultrasonic frequencies. Such is positioned or otherwise associated with first acoustic wave guide 20 to transfer ultrasonic waves between transceiver 18 and first acoustic wave guide 20. Transceiver 18 could also, of course, be provided to operate within other acoustic frequencies, or configured as a separate acoustic wave transmitter and a separate acoustic wave receiver for transmitting and receiving acoustic waves relative to first acoustic wave guide 20. An appropriate ultrasonic transceiver is available from Par Sonics, Centre Hall, Pa. 16828-9738 Model 20006. This is a TEFLON® covered ultrasonic transducer.

The preferred ultrasonic transducer is advantageously energized using a suitable stimulation signal. The preferred stimulation signal is at ultrasonic frequencies, such as approximately 200 kHz. The stimulation signal is supplied to the transducer in pulses of relatively short duration, for example 8–10 cycles. This produces the desired wave front or stimulating beam pulse which is intermittently used. Between pulses the transducer is thereafter not provided with the stimulation signal and the vibrations caused by stimulation dampen out prior to return of the reflected acoustic signals. Transducer 18 is stimulated and monitored using conventional ultrasonic electronics of various suitable designs. The monitoring occurs between the stimulating pulses.

First acoustic wave guide 20 has an associated first central longitudinal axis 30. Second acoustic wave guide 22 has an associated second central longitudinal axis 32. Angled juncture 24 interconnects first acoustic wave guide 20 and second acoustic wave guide 22 such that their respective longitudinal axes 30 and 32 are oriented relative to one another, most preferably at approximately 90°. First acoustic wave guide 20 and second acoustic wave guide 22 are preferably in the form of elongated TEFLON® PTFE tubes, most preferably cylindrical tubes. Angled juncture 24 is also preferably composed of TEFLON®, and is in part formed from a 90° elbow sized to fit in mating relationship with the distal end of first acoustic wave guide 20 and the proximate end of second acoustic wave guide 22. Other materials for the wave guides are suitable depending upon the fluids serviced. An example nominal internal diameter for wave guides 20 and 22 is 1–3 inches (25–75 millimeters).

First acoustic wave guide 20 includes a purge gas port 50, which is preferably at or near the proximate end of the first wave guide. Port 50 is connected to some suitable inert gas source (not shown), such as a facilities nitrogen supply line. Purge gas would be utilized to remove or prevent formation of froth at and above liquid level surface 16 within second acoustic wave guide 22. The resulting purge gas blanket facilitates maintaining substantially standard or constant atmospheric conditions within the wave guides and angled juncture. Such is described in more detail below.

Second acoustic wave guide 22 is defined by tubular sidewalls 42 having a first or proximate longitudinal end portion 44 which mates with angled juncture 24, and a second longitudinal end portion 46 which is adapted to be received within liquid 14 of container 12. The distal end of the second wave guide is typically immersed in the fluid being measured. A plurality of longitudinally spaced orifices 48 extend through sidewalls 42 starting from adjacent second end 46. Holes or orifices 48 facilitate ingress of fluid within secondary acoustic wave guide 22. Such orifices also are utilized in connection with the purge gas cleaning function. An example diameter for orifices 48 is approximately 0.1–0.5 inches (2–12 millimeters).

A primary acoustic reflector 26 is provided within angled juncture 24 to angularly reflect acoustic waves between first acoustic wave guide 20 and second acoustic wave guide 22. A secondary acoustic reflector 28 is positioned to directly receive the waves emanating from acoustic wave transceiver 18 and reflect them directly back to be received by transceiver 18. More particularly, primary acoustic reflector 26 is preferably in the form of a thin, flat, 2 to 3 square inch TEFLON® plate. The back of angled juncture 24, in the form of the 90° elbow, has been cut away at an angle of approximately 45° to provide mounting points for adherence of reflector 26 thereto. Primary reflector 26 includes a planar reflective outer surface 34 which is provided within angled juncture 24 at about 45° relative to first longitudinal axis 30 and second longitudinal axis 32. The primary reflector could otherwise be formed so as to reflectively transfer acoustic waves between acoustic wave guides 20 and 22.

The secondary reflector preferably comprises a feature provided upon the primary reflector. As shown, secondary reflector 28 is formed into primary outer reflective surface 34 and constitutes a cylindrical bore 36 formed therethrough into the mass of the square TEFLON® plate defining first reflector 26. Bore 36 is centrally provided relative to primary reflector surface 34 and within angled juncture 24, and includes a bore axis 38 which is most preferably parallel with respect to both first longitudinal axis 30 and the direction of the acoustic beam emitted from transceiver 18. In the illustrated embodiment, bore axis 38 is coincident with first longitudinal axis 30. Bore 36 terminates in a flat end surface 40 which defines a secondary reflector outer reflective surface. Surface 40 is effectively provided within angled juncture 24 at approximately 90° relative to first longitudinal axis 30. Bore 36 is formed by boring or drilling into outer reflective surface 34 at an angle of 45° relative thereto. Bore diameters in the range of 0.2–0.7 inches (5–20 millimeters) are useful, and more preferably are 0.3–0.5 inches (8–12 millimeters).

In operation, transceiver 18 emits intermittent pulses of ultrasonic waves into first acoustic wave guide 20. The wave pulses are preferably directed along the first longitudinal axis and transmits through wave guide 20 to angled juncture 24. The emitted acoustic beam from transceiver 18 directly impinges onto primary reflector 26 and secondary reflector 28. Reflective outer surface 34 of primary reflector 26 is positioned at an oblique angle relative to the beam direction to reflect the acoustic wave downwardly into second acoustic wave guide 22. The reflected primary outgoing acoustic beam from surface 34 is preferably oriented along second longitudinal axis 32 and onto liquid surface 16. This arrangement produces an acoustic reflection at the liquid surface which results in a liquid surface reflected return primary acoustic beam. The reflected outgoing acoustic beam is preferably oriented perpendicular to the liquid surface. The perpendicular orientations direct the return primary beam along the axis 32 of second wave guide 22. The return primary acoustic beam then reflects off of primary reflector 34 to produce a sensed or detected primary acoustic beam which is sensed by transceiver 18. The transit time, required for the ultrasonic wave transmitted by transceiver 18 to return thereto after it has been reflected by surface 16 can be measured. The distance between the ultrasonic transceiver and liquid surface 16 is calculable therefrom, giving a direct measurement of the level of liquid surface 16.

The velocity of sound waves within the acoustic wave guides and angled juncture can change due to temperature, pressure, presence of chemical vapor generated from liquid 14 or other sources within the guides and juncture, and from other factors. Secondary reflector 28 is provided for calibration purposes to account for such different or changing atmospheric conditions within the apparatus. The reflective surface 40 of bore 36 is positioned to reflect a portion of the emitted beam comprising acoustic waves emitted directly from transceiver 18. Surface 40 reflects the emitted beam and produces a secondary reflected acoustic beam which is oriented directly back to the transceiver preferably along the axis 30 of first wave guide 20. While the distance for the wave to reflect from surface 16 is variable due to changes in liquid level, the distance between the transceiver and secondary reflective surface is effectively constant. Accordingly, the speed of sound within the system is directly determinable for changing atmospheric conditions within the apparatus. The positioning of the secondary reflector in the angled juncture as described for the preferred embodiment facilitates the calibration function by maximizing signal intensity from the direct reflection back to the transceiver without necessarily requiring reflection of the calibrating signal off of other surfaces or devices.

Another factor impacting liquid level determination in container 12 is character of the gas within the acoustic path defined by the wave guides 20, 22 and 24. The speed of sound varies dependent upon the temperature and makeup of the gas through which the sound waves propagate. If the fluid is heated, condensation may occur on the wave guides or reflective surfaces. This in turn leads to changed acoustic properties which affect the accuracy of the measurements being taken. To neutralize the effects of and facilitate removal of any such material, a purge gas is preferably admitted through purge gas port 50 of first wave guide 20. Such gas flows through first wave guide 20, angled juncture 24, downwardly through second acoustic wave guide 22, and outwardly via orifices 48. The flow of purge gas in such instance is preferably high enough to provide effective gas flow outwardly from the orifices above liquid surface 16. This serves to carry vapors from the interior of the wave guides. However, the flow of purge gas is preferably small enough to prevent a significant differential pressure from developing between the interior of the wave guides and outside the wave guides. Relatively constant purge gas flow also advantageously provide a more uniform or constant atmospheric conditions within the wave guides and juncture during monitoring, to thereby improve accuracy.

The above system can be utilized as a means for measuring a quantity of liquid within container 12 to determine when the quantity is diminished to a point requiring replacement. Alternately, the measuring system could be used directly to determine quantity of liquid which has been transferred from container 12 for a given process step.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

I claim:

1. An acoustic liquid level detector system comprising:
   a first acoustic wave guide;
   an acoustic wave transmitter and an acoustic wave receiver operably associated with the first acoustic wave guide to transfer acoustic waves between, a) the acoustic transmitter and receiver; and b) the first acoustic wave guide;
   a second acoustic wave guide;
   an angled juncture interconnecting the first acoustic wave guide to the second acoustic wave guide;
   a primary acoustic reflector provided to the angled juncture to angularly reflect acoustic waves between the first and second acoustic wave guides; and
   a secondary acoustic reflector positioned to directly reflect an acoustic wave emanating from the acoustic wave transmitter to the acoustic wave receiver.
   wherein said secondary reflector comprises a feature formed upon the primary reflector.

2. The acoustic liquid level detector system of claim 1 wherein the transmitter and receiver comprise an integrated acoustic wave transceiver.

3. The acoustic liquid level detector system of claim 1 wherein the transmitter and receiver respectively transmit and receive acoustic waves within ultrasonic frequencies.

4. The acoustic liquid level detector system of claim 1 wherein the secondary reflector is positioned within the angled juncture.

5. The acoustic liquid level detector system of claim 1 wherein the primary reflector includes an outer reflective surface, and the secondary reflector comprises a feature formed into the primary outer reflective surface, the feature being a bore formed through the outer reflective surface into the primary reflector.

6. The acoustic liquid level detector system of claim 1 wherein,
   the first and second acoustic wave guides include respective first and second longitudinal axes, the angled juncture orienting the first and second longitudinal axes relative to one another at about 90°; and
   the primary reflector has a reflective outer surface which is provided within the angled juncture at about 45° relative to the first longitudinal axis, and the secondary reflector has a reflective outer surface which is provided within the angled juncture at about 90° relative to the first longitudinal axis.

7. The acoustic liquid level detector system of claim 1 wherein,
   the first and second acoustic wave guides include respective first and second longitudinal axes, the angled juncture orienting the first and second longitudinal axes relative to one another at about 90°; and
   the primary reflector has a reflective outer surface which is provided within the angled juncture at about 45° relative to the first longitudinal axis, and the secondary reflector comprises a feature formed into the primary outer reflective surface, the feature being a bore formed through the outer reflective surface into the primary reflector, and the bore having a bore axis which is substantially parallel with the first longitudinal axis.

8. The acoustic liquid level detector system of claim 1 wherein the second acoustic wave guide includes sidewalls having a first longitudinal end portion and a second longitudinal end portion, the first end portion joining with the angled juncture, the second end portion being configured to be placed through an upper level of liquid and including a plurality of longitudinally spaced orifices extending through the sidewalls.

9. The acoustic liquid level detector system of claim 1 further comprising a purge gas port provided in the first acoustic wave guide.

10. An acoustic liquid level detector system comprising:
    a first acoustic wave guide;
    an ultrasonic wave transceiver operably associated with the first acoustic wave guide to transfer ultrasonic waves between the ultrasonic transceiver and the first acoustic wave guide;
    a second acoustic wave guide, the second acoustic wave guide including sidewalls having a first longitudinal end portion and a second longitudinal end portion, the first end portion joining with the angled juncture, the second end portion including a plurality of longitudinally spaced fluid communication orifices extending through the sidewalls;
    an angled juncture interconnecting the first acoustic wave guide to the second acoustic wave guide;
    a primary acoustic reflector provided in the angled juncture to angularly reflect ultrasonic waves between the first and second acoustic wave guides; and
    a secondary acoustic reflector positioned to directly reflect an acoustic wave emanating from the acoustic wave transceiver back to the acoustic wave transceiver.
    wherein the secondary reflector comprises a feature provided upon the primary reflector.

11. The acoustic liquid level detector system of claim 10 wherein the secondary reflector is positioned within the angled juncture.

12. The acoustic liquid level detector system of claim 10 wherein the primary reflector includes an outer reflective surface, and the secondary reflector comprises a feature formed into the primary outer reflective surface, the feature being a bore formed through the outer reflective surface into the primary reflector.

13. The acoustic liquid level detector system of claim 10 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector has a reflective outer surface which is provided within the angled juncture at about 90° relative to the first longitudinal axis.

14. The acoustic liquid level detector system of claim 10 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector comprises a feature formed into the primary outer reflective surface, the feature being a bore formed through the outer reflective surface into the primary reflector, and the bore having a bore axis which is substantially parallel with the first longitudinal axis.

15. The acoustic liquid level detector system of claim 10 further comprising a purge gas port provided in the first acoustic wave guide.

16. An acoustic liquid level detector system comprising:

a first acoustic wave guide;

a purge gas port provided in the first acoustic wave guide;

an ultrasonic wave transceiver operably associated with the first acoustic wave guide to transfer ultrasonic waves between the ultrasonic transceiver and the first acoustic wave guide;

a second acoustic wave guide, the second acoustic wave guide including sidewalls having a first longitudinal end portion and a second longitudinal end portion;

an angled juncture interconnecting the first acoustic wave guide to the second acoustic wave guide;

wherein said first end portion joining with the angled juncture, the second end portion including a plurality of longitudinally spaced fluid communication orifices extending through the sidewalls;

a primary acoustic reflector provided in the angled juncture to angularly reflect ultrasonic waves between the first and second acoustic wave guides; and a secondary acoustic reflector centrally provided upon the primary acoustic reflector within the angled juncture to directly reflect an ultrasonic wave emanating from the ultrasonic transceiver through the first wave guide back into the first wave guide to the ultrasonic transceiver.

17. The acoustic liquid level detector system of claim 16 wherein the primary reflector includes an outer reflective surface, and the secondary reflector comprises a feature formed into the primary outer reflective surface, the feature being a bore formed through the outer reflective surface into the primary reflector.

18. The acoustic liquid level detector system of claim 16 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector has a reflective outer surface which is provided within the angled juncture at about 90° relative to the first longitudinal axis.

19. The acoustic liquid level detector system of claim 16 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector comprises a feature formed into the primary outer reflective surface, the feature being a bore formed through the outer reflective surface into the primary reflector, and the bore having a bore axis which is substantially parallel with the first longitudinal axis.

20. An acoustic liquid level detector system comprising:

a first acoustic wave guide;

an acoustic wave transmitter and an acoustic wave receiver operably associated with the first acoustic wave guide to transfer acoustic waves between, a) the acoustic transmitter and receiver; and b) the first acoustic wave guide;

a second acoustic wave guide;

an angled juncture interconnecting the first acoustic wave guide to the second acoustic wave guide;

a primary acoustic reflector provided in the angled juncture to angularly reflect acoustic waves between the first and second acoustic wave guides; and a second acoustic reflector provided in the angled juncture to reflect an acoustic wave emanating from the acoustic wave transmitter through the first wave guide back into the first wave guide to the acoustic wave receiver; wherein the secondary reflector comprises a feature provided upon the primary reflector.

21. The acoustic liquid level detector system of claim 20 wherein the primary reflector includes an outer reflective surface, and the secondary reflector comprises a feature formed into the primary outer reflective surface, the feature being a bore formed through the outer reflective surface into the primary reflector.

22. The acoustic liquid level detector system of claim 20 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector has a reflective outer surface which is provided within the angled juncture at about 90° relative to the first longitudinal axis.

23. The acoustic liquid level detector system of claim 20 wherein, the first and second acoustic wave guides include respective first and second longitudinal axes, the angled juncture orienting the first and second longitudinal axes relative to one another at about 90°; and the primary reflector has a reflective outer surface which is provided within the angled juncture at about 45° relative to the first longitudinal axis, and the secondary reflector comprises a feature formed into the primary outer reflective surface, the feature being a bore formed through the outer reflective surface into the primary reflector, and the bore having a bore axis which is substantially parallel with the first longitudinal axis.

24. The acoustic liquid level detector system of claim 20 wherein the second acoustic wave guide includes sidewalls having a first longitudinal end portion and a second longitudinal end portion, the first end portion joining with the angled juncture, the second end portion being configured to be placed through an upper level of liquid and including a plurality of longitudinally spaced orifices extending through the sidewalls.

25. An acoustic liquid level detector system comprising:

an acoustic wave transmitter;

at least one longitudinally elongated acoustic wave guide operably associated with the transmitter to receive acoustic waves transmitted therefrom, the acoustic wave guide having sidewalls including a first longitudinal end portion and a second longitudinal end portion, the first end portion being configured to receive acoustic waves from the transmitter and transfer such waves to the second end portion, the second end portion being configured to be placed through an upper level of liquid and including a plurality of longitudinally spaced orifices extending through the sidewalls; and means for injecting a purge gas into the acoustic wave guide.

* * * * *